(12) United States Patent
Guan et al.

(10) Patent No.: US 12,433,334 B2
(45) Date of Patent: Oct. 7, 2025

(54) FUEL CELL POWERED VAPORIZER DEVICE

(71) Applicant: JUUL LABS, INC., San Francisco, CA (US)

(72) Inventors: Jie Guan, Morgan Hill, CA (US); Val Valentine, San Francisco, CA (US); Qingcheng Zeng, San Jose, CA (US)

(73) Assignee: JUUL Labs, Inc., Washington, DC (US)

( * ) Notice: Subject to any disclaimer, the term of this patent is extended or adjusted under 35 U.S.C. 154(b) by 579 days.

(21) Appl. No.: 17/686,009

(22) Filed: Mar. 3, 2022

(65) Prior Publication Data

US 2022/0183359 A1    Jun. 16, 2022

Related U.S. Application Data

(63) Continuation of application No. PCT/US2020/049106, filed on Sep. 3, 2020.

(60) Provisional application No. 62/895,116, filed on Sep. 3, 2019.

(51) Int. Cl.
*A24F 40/42* (2020.01)
*A24F 40/44* (2020.01)
*A24F 40/46* (2020.01)

(52) U.S. Cl.
CPC .............. *A24F 40/42* (2020.01); *A24F 40/44* (2020.01); *A24F 40/46* (2020.01)

(58) Field of Classification Search
CPC .......... A24F 40/42; A24F 40/44; A24F 40/10; H01M 2300/0071; H01M 2008/1293; H01M 2250/30; H01M 2300/0014; H01M 8/04067; H01M 8/083; H01M 8/12; Y02B 90/10
See application file for complete search history.

(56) References Cited

U.S. PATENT DOCUMENTS

| | | | |
|---|---|---|---|
| 7,987,846 B2 | 8/2011 | Hale et al. |
| 8,794,231 B2 | 8/2014 | Thorens et al. |
| 8,997,754 B2 | 4/2015 | Tucker et al. |
| 9,067,029 B2 | 6/2015 | Yamada et al. |
| 9,132,248 B2 | 9/2015 | Qiu |
| 9,282,772 B2 | 3/2016 | Tucker et al. |
| 9,326,547 B2 | 5/2016 | Tucker et al. |
| 9,420,829 B2 | 8/2016 | Thorens et al. |

(Continued)

FOREIGN PATENT DOCUMENTS

| | | |
|---|---|---|
| CN | 1575673 A | 2/2005 |
| EP | 1511399 A1 | 3/2005 |

(Continued)

*Primary Examiner* — Jean F Duverne
(74) *Attorney, Agent, or Firm* — Mintz, Levin, Cohn, Ferris, Glovsky and Popeo, P.C.

(57) ABSTRACT

A vaporizer device includes a fuel cell disposed with a device body and configured to receive a cartridge having a first compartment that holds a vaporizable material, a second compartment that holds a fuel, a heating element, and a wicking element that can draw the vaporizable material to the heating element to be vaporized. The vaporizer cartridge is configured for fluidically, thermally, and/or electrically coupling to a vaporizer device body. Various implementations of the vaporizer cartridge are described that include one or more features for a fuel cell within the cartridge.

20 Claims, 3 Drawing Sheets

(56) References Cited

U.S. PATENT DOCUMENTS

| | | |
|---|---|---|
| 9,723,876 B2 | 8/2017 | Cadieux et al. |
| 9,877,508 B2 | 1/2018 | Kane |
| 9,877,511 B2 | 1/2018 | Li et al. |
| 9,980,514 B2 | 5/2018 | Malamud et al. |
| 10,010,109 B2 | 7/2018 | Janardhan et al. |
| 10,015,991 B1 | 7/2018 | Tucker et al. |
| 10,028,537 B1 | 7/2018 | Hawes et al. |
| 10,098,381 B2 | 10/2018 | Kane et al. |
| 10,104,913 B2 | 10/2018 | Lau et al. |
| 10,143,239 B2 | 12/2018 | Gavrielov et al. |
| 10,251,422 B2 | 4/2019 | Koller |
| 10,258,085 B2 * | 4/2019 | Xu .................... A24F 42/60 |
| 10,258,087 B2 | 4/2019 | Kane |
| 10,264,821 B2 | 4/2019 | Lipowicz |
| 10,278,423 B2 | 5/2019 | Smith et al. |
| 10,278,424 B2 | 5/2019 | Garthaffner et al. |
| 10,285,450 B2 | 5/2019 | Gavrielov et al. |
| 10,314,338 B2 | 6/2019 | Hawes et al. |
| 10,314,343 B2 | 6/2019 | Newcomb et al. |
| 10,321,712 B2 | 6/2019 | Lipowicz |
| 10,327,474 B2 | 6/2019 | Hawes et al. |
| 10,357,060 B2 | 7/2019 | Rostami et al. |
| 10,368,580 B2 | 8/2019 | Rostami et al. |
| 10,433,581 B2 | 10/2019 | Li et al. |
| 10,463,077 B2 | 11/2019 | Lau et al. |
| 10,506,830 B2 | 12/2019 | Li et al. |
| 10,518,243 B2 | 12/2019 | Macko et al. |
| 10,524,505 B2 | 1/2020 | Keen |
| 10,660,363 B2 | 5/2020 | Cadieux et al. |
| 10,660,365 B2 | 5/2020 | Lipowicz et al. |
| 10,671,031 B2 | 6/2020 | Hawes et al. |
| 10,701,981 B2 | 7/2020 | Newcomb et al. |
| 10,721,965 B2 | 7/2020 | Lipowicz |
| 10,729,177 B2 | 8/2020 | Dendy et al. |
| 10,736,356 B2 | 8/2020 | Jordan et al. |
| 10,772,356 B2 | 9/2020 | Tucker et al. |
| 10,813,384 B2 | 10/2020 | Bache et al. |
| 10,842,193 B2 | 11/2020 | Sahin et al. |
| 10,874,139 B2 | 12/2020 | Alvarez |
| 10,881,139 B2 | 1/2021 | Li et al. |
| 10,945,461 B2 | 3/2021 | Juster et al. |
| 10,966,464 B2 | 4/2021 | Thorens et al. |
| 10,994,086 B2 | 5/2021 | Garthaffner et al. |
| 11,013,267 B2 | 5/2021 | Rostami et al. |
| 11,035,704 B2 | 6/2021 | Kane et al. |
| 11,083,229 B2 | 8/2021 | Holtz et al. |
| 11,090,450 B2 | 8/2021 | Li et al. |
| 11,129,410 B2 | 9/2021 | Barbaric et al. |
| 11,129,413 B2 | 9/2021 | Lipowicz et al. |
| 11,253,001 B2 | 2/2022 | Atkins et al. |
| 11,272,736 B2 | 3/2022 | Rostami |
| 11,439,184 B2 | 9/2022 | Bowen et al. |
| 2007/0079889 A1 | 4/2007 | Lindsay et al. |
| 2008/0029095 A1 | 2/2008 | Esser |
| 2013/0213418 A1 | 8/2013 | Tucker et al. |
| 2014/0238422 A1 | 8/2014 | Plunkett et al. |
| 2014/0238423 A1 | 8/2014 | Tucker et al. |
| 2014/0238424 A1 | 8/2014 | Macko et al. |
| 2014/0261488 A1 | 9/2014 | Tucker et al. |
| 2014/0261493 A1 | 9/2014 | Smith et al. |
| 2015/0245669 A1 | 9/2015 | Cadieux et al. |
| 2015/0313275 A1 | 11/2015 | Anderson et al. |
| 2016/0081395 A1 | 3/2016 | Thorens et al. |
| 2016/0213866 A1 | 7/2016 | Tan |
| 2017/0150753 A1 | 6/2017 | Macko |
| 2017/0245547 A1 | 8/2017 | Lipowicz |
| 2017/0251721 A1 | 9/2017 | Rostami et al. |
| 2017/0251722 A1 | 9/2017 | Kobal et al. |
| 2017/0251723 A1 | 9/2017 | Kobal et al. |
| 2017/0251726 A1 | 9/2017 | Nielsen |
| 2017/0258138 A1 | 9/2017 | Rostami et al. |
| 2017/0258140 A1 | 9/2017 | Rostami et al. |
| 2017/0265524 A1 | 9/2017 | Cadieux et al. |
| 2017/0273354 A1 | 9/2017 | Tucker et al. |
| 2017/0290370 A1 | 10/2017 | Garthaffner et al. |
| 2017/0325502 A1 | 11/2017 | Nelson et al. |
| 2018/0132525 A1 | 5/2018 | Patil et al. |
| 2018/0279685 A1 | 10/2018 | Thorens et al. |
| 2018/0317557 A1 * | 11/2018 | Monsees .............. A61M 11/042 |
| 2019/0104764 A1 | 4/2019 | Tucker et al. |
| 2019/0200674 A1 | 7/2019 | Tucker et al. |
| 2019/0321570 A1 * | 10/2019 | Rubin ................. A61M 16/209 |

FOREIGN PATENT DOCUMENTS

| | | | |
|---|---|---|---|
| EP | 3207954 A1 | 8/2017 | |
| JP | 2004192820 A * | 7/2004 | |
| RU | 2004136581 A | 2/2006 | |
| SU | 1837815 A3 * | 8/1993 | .......... A24F 47/004 |
| WO | WO-2012026963 A2 | 3/2012 | |
| WO | WO-2016172023 A1 | 10/2016 | |
| WO | WO-2020025644 A1 | 2/2020 | |
| WO | WO-2020176901 A2 | 9/2020 | |

\* cited by examiner

FUEL CELL POWERED VAPORIZER DEVICE

CROSS REFERENCE TO RELATED APPLICATIONS

This application claims priority to International Application No. PCT/US2020/049106, filed Sep. 3, 2020, which claims priority to U.S. Provisional Application No. 62/895,116, filed Sep. 3, 2019, which is hereby incorporated by reference in its entirety and for all purposes.

TECHNICAL FIELD

The subject matter described herein relates to vaporizer devices, including a vaporizer device powered by a fuel cell.

BACKGROUND

Vaporizer devices, which can also be referred to as vaporizers, electronic vaporizer devices or e-vaporizer devices, can be used for delivery of an aerosol (or "vapor") containing one or more active ingredients by inhalation of the aerosol by a user of the vaporizing device. For example, electronic nicotine delivery systems (ENDS) include a class of vaporizer devices that are typically battery powered and that may be used to simulate the experience of smoking, but without burning of tobacco or other substances.

In use of a vaporizer device, the user inhales an aerosol, commonly called vapor, which may be generated by a heating element that vaporizes (e.g., causing a liquid or solid to at least partially transition to the gas phase) a vaporizable material, which may be liquid, a solution, a solid, a wax, or any other form as may be compatible with use of a specific vaporizer device. The vaporizable material used with a vaporizer can be provided within a cartridge (e.g., a separable part of the vaporizer that contains the vaporizable material in a reservoir or a compartment) that includes a mouthpiece (e.g., for inhalation by a user).

To receive the inhalable aerosol generated by a vaporizer device, a user may, in certain examples, activate the vaporizer device by taking a puff, by pressing a button, or by some other approach. A puff, as the term is generally used (and also used herein), refers to inhalation by the user in a manner that causes a volume of air to be drawn into the vaporizer device such that the inhalable aerosol is generated by a combination of vaporized vaporizable material with the air.

A typical approach by which a vaporizer device generates an inhalable aerosol from a vaporizable material involves heating the vaporizable material in a vaporization chamber (or a heater chamber) to cause the vaporizable material to be converted to the gas (or vapor) phase. A vaporization chamber generally refers to an area or volume in the vaporizer device within which a heat source (e.g., conductive, convective, and/or radiative) causes heating of a vaporizable material to produce a mixture of air and vaporized vaporizable material to form a vapor for inhalation by a user of the vaporizer device.

The term vaporizer device, as used herein consistent with the current subject matter, generally refers to portable, self-contained, devices that are convenient for personal use. Typically, such devices include batteries and are controlled by one or more switches, buttons, touch sensitive devices, or other user input functionality or the like (which can be referred to generally as controls) on the vaporizer, although a number of devices that may wirelessly communicate with an external controller (e.g., a smartphone, a smart watch, other wearable electronic devices, etc.) have recently become available. The batteries frequently require recharging, which requires an electrical power source such as an electrical outlet. Without recharging the batteries, a conventional vaporizer device will not operate.

Various vaporizable materials having a variety of contents and proportions of such contents can be contained in the cartridge. Some vaporizable materials, for example, may have a smaller percentage of active ingredients per total volume of vaporizable material, such as due to regulations requiring certain active ingredient percentages. As a result, a user may need to vaporize a large amount of vaporizable material (e.g., compared to the overall volume of vaporizable material that can be stored in a cartridge) to achieve a desired effect.

SUMMARY

In certain aspects of the current subject matter, challenges associated with the availability of electricity to charge a vaporizer device may be addressed by inclusion of one or more of the features described herein or comparable/equivalent approaches as would be understood by one of ordinary skill in the art. Aspects of the current subject matter relate to methods, devices, and systems for a vaporizer device powered by a fuel cell.

Some variations of the methods, devices, and systems described herein are drawn to novel vaporizing device consisting of a mouthpiece and a device body containing a fuel cell, a low temperature vaporization chamber, a fuel tank, a regulator may be used to control flow rate of the heat to maintain a stable operating temperature. These devices may provide a mouthpiece made of a high temperature food-safe material, such as ceramic, glass, or high temperature plastics known as PEI resin (brand name Ultem). However, suitable plastic or wood, etc., could also be used but would additionally require an insulating material that would prevent excessive heat reaching the user's lips.

In some variations, one or more of the following features may optionally be included in any feasible combination.

The vaporizer device is powered by a fuel cell. In implementations, the fuel cell may be configured as one or more fuel cell elements with flat saturated media interposed at least partially between the fuel cell elements. The fuel cell elements are in thermal contact with the saturated media. The saturated media can be a nicotine saturated media.

In implementations, a cartridge for a vaporizer device powered by a fuel cell is provided, the cartridge comprising: a first compartment configured to hold a vaporizable material; a second compartment configured to hold a fuel; an outlet fluidically coupled to the second compartment and configured to deliver the fuel to the fuel cell; and a vaporization chamber in fluid communication with the first compartment, the vaporization chamber configured to vaporize the vaporizable material included in the first compartment when the fuel from the second compartment is delivered to the fuel cell.

In implementations, the vaporizable material includes a nicotine formulation. In implementations, a level of the vaporizable material is visible through a transparent portion of the first compartment. In implementations, a level of the fuel is visible through a transparent portion of the second compartment. In implementations, the outlet is disposed at a first end of the cartridge. In implementations, a mouthpiece is disposed at a second end of the cartridge, and wherein the second end is opposite to the first end. In implementations, the cartridge further includes a cannula to fluidically couple the vaporization chamber to the mouthpiece. In implementations, the vaporization chamber is disposed within the mouthpiece. In implementations, the cartridge further includes a cartridge electrical contact disposed on an outer surface of the cartridge, the cartridge electrical contact configured to conduct heat from the fuel cell to the cartridge. In implementations, the cartridge further includes a resistive heater disposed within the vaporization chamber.

In implementations, the cartridge further includes a conductive heating element disposed within the vaporization chamber. In implementations, the cartridge further includes a cartridge thermal contact disposed on an outer surface of the cartridge, the cartridge thermal contact configured to conduct heat from the fuel cell to the cartridge. In implementations, the cartridge further includes a cartridge thermal contact disposed in a recessed portion of the cartridge to conduct heat from the fuel cell to the cartridge. In implementations, the cartridge further includes a wick having a first portion fluidically coupled to the first compartment and a second portion fluidically coupled to the vaporization chamber, the wick configured to transport the vaporizable material into the vaporization chamber. In implementations, the second compartment further includes an expansion chamber configured to reduce a pressure buildup.

In implementations, the fuel cell is a solid oxide fuel cell. In implementations, the fuel cell is a low temperature solid oxide fuel cell. In implementations, the fuel cell operates at a temperature less than or equal to 500 degrees Celsius. In implementations, the fuel cell operates at a temperature in the range of 270-290 degrees Celsius.

In another interrelated aspect of the current subject matter, a vaporizer device is provided, comprising: a body; a receptacle disposed at one end of the body, the receptacle configured to receive a cartridge at the proximal end; and a fuel cell disposed within the body.

In implementations, an exterior surface of the body is free of electrical contacts. In implementations, the vaporizer device further includes a first air inlet configured to provide, to the cartridge received at the proximal end, an airflow. In implementations, the first air inlet is disposed on an exterior surface of the body. In implementations, the first air inlet is disposed in the receptacle.

In implementations, the vaporizer device further includes a second air inlet configured to provide an airflow to the fuel cell. The second air inlet can be disposed on an exterior surface of the body. The second air inlet can be disposed in the receptacle. The vaporizer device can further include a device electrical contact configured to electrically couple with a cartridge electrical contact. The vaporizer device can further include a device thermal contact configured to thermally couple with a cartridge thermal contact. The fuel cell is configured to produce heat transferrable to a vaporizable material included in the cartridge. In implementations, the fuel cell is configured to produce electricity transferrable to a resistive heater disposed in the cartridge. The fuel cell can be a solid oxide fuel cell. In particular, the fuel cell can be a low temperature solid oxide fuel cell. The fuel cell may operate at a temperature less than or equal to 500 degrees Celsius. In implementations, the fuel cell operates at a temperature in the range of 270-290 degrees Celsius.

In implementations, a system comprising the cartridge and the vaporizer device is provided. The vaporizable material can include a nicotine formulation.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

Implementations of the current subject matter include devices relating to vaporizing of one or more materials for inhalation by a user. The term "vaporizer" is used generically in the following description to refer to a vaporizer device. Examples of vaporizers consistent with implementations of the current subject matter include thermal vaporizers or the like. Such vaporizers are generally portable, hand-held devices that heat a vaporizable material to provide an inhalable dose of the vaporizable material.

The vaporizable material used with a vaporizer may be provided within a cartridge (e.g., a part of the vaporizer that contains the vaporizable material in a first compartment or other container and that can be refillable when empty or disposable in favor of a new cartridge containing additional vaporizable material of a same or different type). A vaporizer may be a cartridge-using vaporizer, a cartridge-less vaporizer, or a multi-use vaporizer capable of use with or without a cartridge. For example, a multi-use vaporizer may include a heating chamber configured to receive a vaporizable material directly in the heating chamber and also to receive a cartridge or other replaceable device having a first compartment, a reservoir, a volume, or the like for at least partially containing a usable amount of vaporizable material.

In various implementations, a vaporizer may be configured for use with liquid vaporizable material (e.g., a carrier solution in which an active and/or inactive ingredient(s) are suspended or held in solution or a neat liquid form of the vaporizable material itself) or a solid vaporizable material. A solid vaporizable material may include a plant material that emits some part of the plant material as the vaporizable material (e.g., such that some part of the plant material remains as waste after the vaporizable material is emitted for inhalation by a user) or optionally can be a solid form of the vaporizable material itself (e.g., a "wax") such that all of the solid material can eventually be vaporized for inhalation. A liquid vaporizable material can likewise be capable of being completely vaporized or can include some part of the liquid material that remains after all of the material suitable for inhalation has been consumed.

Figure 1A:
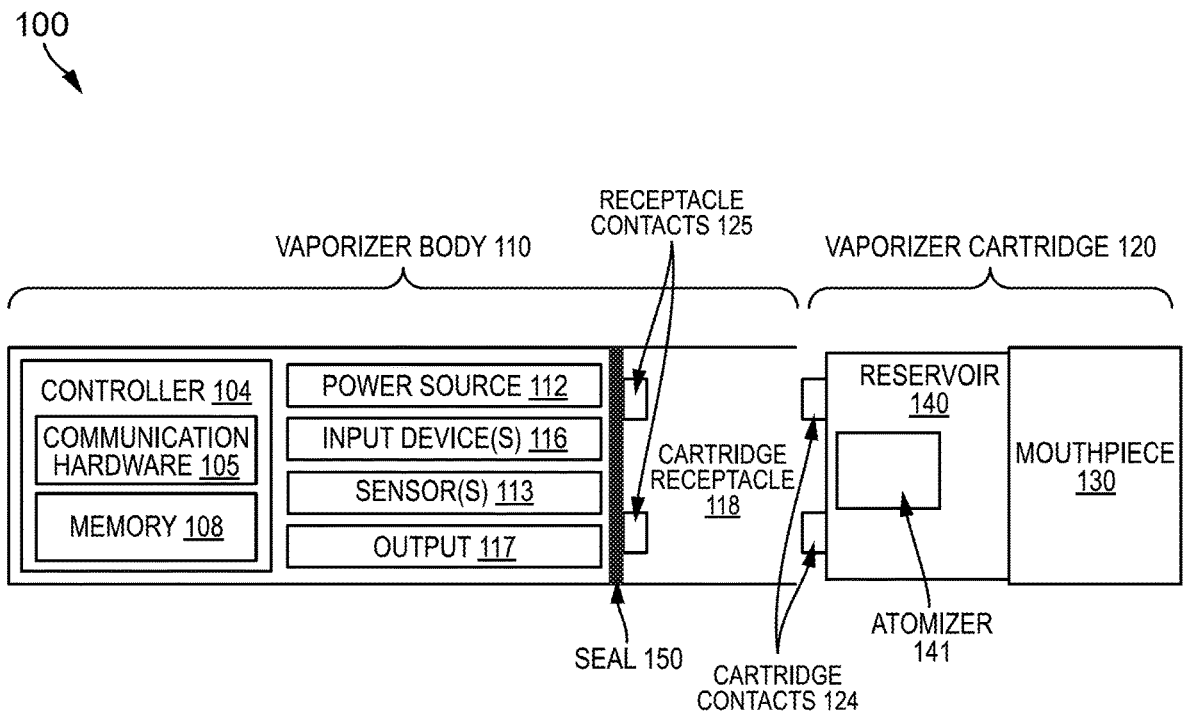
FIG. 1A illustrates a block diagram of a vaporizer.

Referring to the block diagram of FIG. 1A, a vaporizer 100 typically includes a power source 112 (i.e. a fuel cell), and a controller 104 (e.g., a processor, circuitry, etc. capable of executing logic) for controlling heat to an atomizer 141 to cause a vaporizable material stored in reservoir 140 to be converted from a condensed form (e.g., a solid, a liquid, a solution, a suspension, a part of an at least partially unprocessed plant material, etc.) to the gas phase. The controller 104 may be part of one or more printed circuit boards (PCBs) consistent with certain implementations of the current subject matter.

After conversion of the vaporizable material to the gas phase, and depending on the type of vaporizer, the physical and chemical properties of the vaporizable material, and/or other factors, at least some of the gas-phase vaporizable material may condense to form particulate matter in at least a partial local equilibrium with the gas phase as part of an aerosol, which can form some or all of an inhalable dose provided by the vaporizer 100 to a user via the mouthpiece 130 for a given puff or draw on the vaporizer. It will be understood that the interplay between gas and condensed phases in an aerosol generated by a vaporizer can be complex and dynamic, as factors such as ambient temperature, relative humidity, chemistry, flow conditions in airflow paths (both inside the vaporizer and in the airways of a human or other animal), mixing of the gas-phase or aerosol-phase vaporizable material with other air streams, etc. may affect one or more physical parameters of an aerosol. In some vaporizers, and particularly for vaporizers for delivery of more volatile vaporizable materials, the inhalable dose may exist predominantly in the gas phase (i.e., formation of condensed phase particles may be very limited).

Vaporizers for use with liquid vaporizable materials (e.g., neat liquids, suspensions, solutions, mixtures, etc.) typically include an atomizer 141 in which a wicking element (also referred to herein as a wick (not shown in FIG. 1A), which can include any material capable of causing fluid motion by capillary action) conveys an amount of a liquid vaporizable material to a part of the atomizer that includes a heating element (also not shown in FIG. 1A). The wicking element is generally configured to draw liquid vaporizable material from a reservoir or compartment configured to contain (and that may in use contain) the liquid vaporizable material such that the liquid vaporizable material may be vaporized by heat delivered from a heating element. The wicking element may also optionally allow air to enter the reservoir or compartment to replace the volume of liquid removed. In other words, capillary action pulls liquid vaporizable material into the wick for vaporization by the heating element (described below), and air may, in implementations of the current subject matter, return to the reservoir or compartment through the wick to at least partially equalize pressure in the reservoir or compartment. Other approaches to allowing air back into the reservoir to equalize pressure are also within the scope of the current subject matter.

The heating element can be or include one or more of a conductive heater, a radiative heater, a thermally conductive heater, and a convective heater. One type of heating element is a resistive heating element, which can be constructed of or at least include a material (e.g., a metal or alloy, for example a nickel-chromium alloy, or a non-metallic resistor) configured to dissipate electrical power in the form of heat when electrical current is passed through one or more resistive segments of the heating element. An atomizer can include a heating element that includes resistive coil or other heating element wrapped around, positioned within, integrated into a bulk shape of, pressed into thermal contact with, or otherwise arranged to deliver heat to a wicking element to cause a liquid vaporizable material drawn by the wicking element from a reservoir or compartment to be vaporized for subsequent inhalation by a user in a gas and/or a condensed (e.g., aerosol particles or droplets) phase. Other wicking element, heating element, and/or atomizer assembly configurations are also possible, as discussed further below. For example, in the case of a fuel cell as a power source, fuel may be directly converted to heat to be passed to the wicking element either directly or via a thermally conductive heater.

The heating element may be activated (e.g., a controller, which is optionally part of a vaporizer body as discussed below, may cause current to pass from the power source through a circuit including the resistive heating element, which is optionally part of a vaporizer cartridge as discussed below), in association with a user puffing (e.g., drawing, inhaling, etc.) on a mouthpiece 130 of the vaporizer to cause air to flow from an air inlet, along an airflow path that passes an atomizer (e.g., wicking element and heating element), optionally through one or more condensation areas or chambers, to an air outlet in the mouthpiece. Incoming air passing along the airflow path passes over, through, etc. the atomizer, where gas phase vaporizable material is entrained into the air. As noted above, the entrained gas-phase vaporizable material may condense as it passes through the remainder of the airflow path such that an inhalable dose of the vaporizable material in an aerosol form can be delivered from the air outlet (e.g., in a mouthpiece 130 for inhalation by a user).

Activation of the heating element may be caused by automatic detection of the puff based on one or more of signals generated by one or more sensors 113, such as for example a pressure sensor or sensors disposed to detect pressure along the airflow path relative to ambient pressure (or optionally to measure changes in absolute pressure), one or more motion sensors of the vaporizer, one or more flow sensors of the vaporizer, a capacitive lip sensor of the vaporizer; in response to detection of interaction of a user with one or more input devices 116 (e.g., buttons or other tactile control devices of the vaporizer 100), receipt of signals from a computing device in communication with the vaporizer; and/or via other approaches for determining that a puff is occurring or imminent.

A vaporizer may be configured to connect (e.g., wirelessly or via a wired connection) to a computing device (or optionally two or more devices) in communication with the vaporizer. To this end, the controller 104 may include communication hardware 105. The controller 104 may also include a memory 108. A computing device can be a component of a vaporizer system that also includes the vaporizer 100, and can include its own communication hardware, which can establish a wireless communication channel with the communication hardware 105 of the vaporizer 100. For example, a computing device used as part of a vaporizer system may include a general purpose computing device (e.g., a smartphone, a tablet, a personal computer, some other portable device such as a smartwatch, or the like) that executes software to produce a user interface for enabling a user of the device to interact with a vaporizer. In other implementations of the current subject matter, such a device used as part of a vaporizer system can be a dedicated piece of hardware such as a remote control or other wireless or wired device having one or more physical or soft (e.g., configurable on a screen or other display device and selectable via user interaction with a touch-sensitive screen or some other input device like a mouse, pointer, trackball, cursor buttons, or the like) interface controls. The vaporizer can also include one or more output 117 features or devices for providing information to the user.

A computing device that is part of a vaporizer system as defined above can be used for any of one or more functions, such as controlling dosing (e.g., dose monitoring, dose setting, dose limiting, user tracking, etc.), controlling sessioning (e.g., session monitoring, session setting, session limiting, user tracking, etc.), controlling nicotine delivery (e.g., switching between nicotine and non-nicotine vaporizable material, adjusting an amount of nicotine delivered, etc.), obtaining locational information (e.g., location of other users, retailer/commercial venue locations, vaping locations, relative or absolute location of the vaporizer itself, etc.), vaporizer personalization (e.g., naming the vaporizer, locking/password protecting the vaporizer, adjusting one or more parental controls, associating the vaporizer with a user group, registering the vaporizer with a manufacturer or warranty maintenance organization, etc.), engaging in social activities (e.g., games, social media communications, interacting with one or more groups, etc.) with other users, or the like. The terms "sessioning", "session", "vaporizer session," or "vapor session," are used generically to refer to a period devoted to the use of the vaporizer. The period can include a time period, a number of doses, an amount of vaporizable material, and/or the like.

In the example in which a computing device provides signals related to activation of the resistive heating element, or in other examples of coupling of a computing device with a vaporizer for implementation of various control or other functions, the computing device executes one or more computer instructions sets to provide a user interface and underlying data handling. In one example, detection by the computing device of user interaction with one or more user interface elements can cause the computing device to signal the vaporizer 100 to activate the heating element, either to a full operating temperature for creation of an inhalable dose of vapor/aerosol. Other functions of the vaporizer may be controlled by an interaction of a user with a user interface on a computing device in communication with the vaporizer.

The temperature of a heating element of a vaporizer 100 may depend on a number of factors, including an amount of electrical power delivered to the resistive heating element and/or a duty cycle at which the electrical power is delivered, conductive heat transfer to other parts of the electronic vaporizer and/or to the environment, latent heat losses due to vaporization of a vaporizable material from the wicking element and/or the atomizer as a whole, and convective heat losses due to airflow (e.g., air moving across the heating element or the atomizer as a whole when a user inhales on the electronic vaporizer). As noted above, to reliably activate the heating element or heat the heating element to a desired temperature, a vaporizer may make use of signals from a pressure sensor to determine when a user is inhaling. The pressure sensor can be positioned in the airflow path and/or can be connected (e.g., by a passageway or other path) to an airflow path connecting an inlet for air to enter the device and an outlet via which the user inhales the resulting vapor and/or aerosol such that the pressure sensor experiences pressure changes concurrently with air passing through the vaporizer device from the air inlet to the air outlet. In implementations of the current subject matter, the heating element may be activated in association with a user's puff, for example by automatic detection of the puff, for example by the pressure sensor detecting a pressure change in the airflow path.

Typically, the pressure sensor (as well as any other sensors 113) can be positioned on or coupled (e.g., electrically or electronically connected, either physically or via a wireless connection) to the controller 104 (e.g., a printed circuit board assembly or other type of circuit board). To take measurements accurately and maintain durability of the vaporizer, it can be beneficial to provide a resilient seal 150 to separate an airflow path from other parts of the vaporizer. The seal 150, which can be a gasket, may be configured to at least partially surround the pressure sensor such that connections of the pressure sensor to internal circuitry of the vaporizer are separated from a part of the pressure sensor exposed to the airflow path. In an example of a cartridge-based vaporizer, the seal 150 may also separate parts of one or more electrical connections between a vaporizer body 110 and a vaporizer cartridge 120. Such arrangements of a seal 150 in a vaporizer 100 can be helpful in mitigating against potentially disruptive impacts on vaporizer components resulting from interactions with environmental factors such as water in the vapor or liquid phases, other fluids such as the vaporizable material, etc. and/or to reduce escape of air from the designed airflow path in the vaporizer. Unwanted air, liquid or other fluid passing and/or contacting circuitry of the vaporizer can cause various unwanted effects, such as alter pressure readings, and/or can result in the buildup of unwanted material, such as moisture, the vaporizable material, etc. in parts of the vaporizer where they may result in poor pressure signal, degradation of the pressure sensor or other components, and/or a shorter life of the vaporizer. Leaks in the seal 150 can also result in a user inhaling air that has passed over parts of the vaporizer device containing or constructed of materials that may not be desirable to be inhaled.

A general class of vaporizers that have recently gained popularity includes a vaporizer body 110 that includes a controller 104, a power source 112 (e.g., battery), one more sensors 113, charging contacts, a seal 150, and a cartridge receptacle 118 configured to receive a vaporizer cartridge 120 for coupling with the vaporizer body through one or more of a variety of attachment structures. In some examples, vaporizer cartridge 120 includes a reservoir 140 for containing a liquid vaporizable material and a mouthpiece 130 for delivering an inhalable dose to a user. The vaporizer cartridge can include an atomizer 141 having a wicking element and a heating element, or alternatively, one or both of the wicking element and the heating element can be part of the vaporizer body. In implementations in which any part of the atomizer 141 (e.g., heating element and/or wicking element) is part of the vaporizer body, the vaporizer can be configured to supply liquid vaporizer material from a reservoir or a compartment in the vaporizer cartridge to the atomizer part(s) included in the vaporizer body.

Cartridge-based configurations for vaporizers that generate an inhalable dose of a non-liquid vaporizable material via heating of a non-liquid vaporizable material are also within the scope of the current subject matter. For example, a vaporizer cartridge may include a mass of a plant material that is processed and formed to have direct contact with parts of one or more resistive heating elements, and such a vaporizer cartridge may be configured to be coupled mechanically and electrically to a vaporizer body the includes a processor, a power source, and electrical contacts for connecting to corresponding cartridge contacts for completing a circuit with the one or more resistive heating elements.

In vaporizers in which the power source 112 is part of a vaporizer body 110 and a heating element is disposed in a vaporizer cartridge 120 configured to couple with the vaporizer body 110, the vaporizer 100 may include electrical connection features (e.g., means for completing a circuit) for completing a circuit that includes the controller 104 (e.g., a printed circuit board, a microcontroller, or the like), the power source, and the heating element. These features may include at least two contacts on a bottom surface of the vaporizer cartridge 120 (referred to herein as cartridge contacts 124) and at least two contacts disposed near a base of the cartridge receptacle (referred to herein as receptacle contacts 125) of the vaporizer 100 such that the cartridge contacts 124 and the receptacle contacts 125 make electrical connections when the vaporizer cartridge 120 is inserted into and coupled with the cartridge receptacle 118. The circuit completed by these electrical connections can allow delivery of electrical current to the resistive heating element and may further be used for additional functions, such as for example for measuring a resistance of the resistive heating element for use in determining and/or controlling a temperature of the resistive heating element based on a thermal coefficient of resistivity of the resistive heating element, for identifying a cartridge based on one or more electrical characteristics of a resistive heating element or the other circuitry of the vaporizer cartridge, etc.

In some examples of the current subject matter, the at least two cartridge contacts and the at least two receptacle contacts can be configured to electrically or physically connect in either of at least two orientations. In other words, one or more circuits necessary for operation of the vaporizer can be completed by insertion of a vaporizer cartridge 120 in the cartridge receptacle 118 in a first rotational orientation (around an axis along which the end of the vaporizer cartridge having the cartridge is inserted into the cartridge receptacle 118 of the vaporizer body 110) such that a first cartridge contact of the at least two cartridge contacts 124 is electrically or physically connected to a first receptacle contact of the at least two receptacle contacts 125 and a second cartridge contact of the at least two cartridge contacts 124 is electrically or physically connected to a second receptacle contact of the at least two receptacle contacts 125. Furthermore, the one or more circuits necessary for operation of the vaporizer can be completed by insertion of a vaporizer cartridge 120 in the cartridge receptacle 118 in a second rotational orientation such that the first cartridge contact of the at least two cartridge contacts 124 is electrically or physically connected to the second receptacle contact of the at least two receptacle contacts 125 and the second cartridge contact of the at least two cartridge contacts 124 is electrically or physically connected to the first receptacle contact of the at least two receptacle contacts 125. This feature of a vaporizer cartridge 120 being reversible insertable into a cartridge receptacle 118 of the vaporizer body 110 is described further below.

In one example of an attachment structure for coupling a vaporizer cartridge 120 to a vaporizer body, the vaporizer body 110 includes a detent (e.g., a dimple, protrusion, etc.) protruding inwardly from an inner surface the cartridge receptacle 118. One or more exterior surfaces of the vaporizer cartridge 120 can include corresponding recesses (not shown in FIG. 1A) that can fit and/or otherwise snap over such detents when an end of the vaporizer cartridge 120 inserted into the cartridge receptacle 118 on the vaporizer body 110. When the vaporizer cartridge 120 and the vaporizer body 110 are coupled (e.g., by insertion of an end of the vaporizer cartridge 120 into the cartridge receptacle 118 of the vaporizer body 110), the detent into the vaporizer body 110 may fit within and/or otherwise be held within the recesses of the vaporizer cartridge 120 to hold the vaporizer cartridge 120 in place when assembled. Such a detent-recess assembly can provide enough support to hold the vaporizer cartridge 120 in place to ensure good contact between the at least two cartridge contacts 124 and the at least two receptacle contacts 125, while allowing release of the vaporizer cartridge 120 from the vaporizer body 110 when a user pulls with reasonable force on the vaporizer cartridge 120 to disengage the vaporizer cartridge 120 from the cartridge receptacle 118.

Further to the discussion above about the electrical connections between a vaporizer cartridge and a vaporizer body being reversible such that at least two rotational orientations of the vaporizer cartridge in the cartridge receptacle are possible, in some vaporizers the shape of the vaporizer cartridge, or at least a shape of the end of the vaporizer cartridge that is configured for insertion into the cartridge receptacle may have rotational symmetry of at least order two. In other words, the vaporizer cartridge or at least the insertable end of the vaporizer cartridge may be symmetric upon a rotation of 180° around an axis along which the vaporizer cartridge is inserted into the cartridge receptacle. In such a configuration, the circuitry of the vaporizer may support identical operation regardless of which symmetrical orientation of the vaporizer cartridge occurs.

In some examples, the vaporizer cartridge, or at least an end of the vaporizer cartridge configured for insertion in the cartridge receptacle may have a non-circular cross section transverse to the axis along which the vaporizer cartridge is inserted into the cartridge receptacle. For example, the non-circular cross section may be approximately rectangular, approximately elliptical (e.g., have an approximately oval shape), non-rectangular but with two sets of parallel or approximately parallel opposing sides (e.g., having a parallelogram-like shape), or other shapes having rotational symmetry of at least order two. In this context, approximately having a shape indicates that a basic likeness to the described shape is apparent, but that sides of the shape in question need not be completely linear and vertices need not be completely sharp. Rounding of both or either of edges or vertices of the cross-sectional shape is contemplated in the description of any non-circular cross section referred to herein.

The at least two cartridge contacts and the at least two receptacle contacts can take various forms. For example, one or both sets of contacts may include conductive pins, tabs, posts, receiving holes for pins or posts, or the like. Some types of contacts may include springs or other urging features to cause better physical and electrical contact between the contacts on the vaporizer cartridge and the vaporizer body.

Figure 1B:
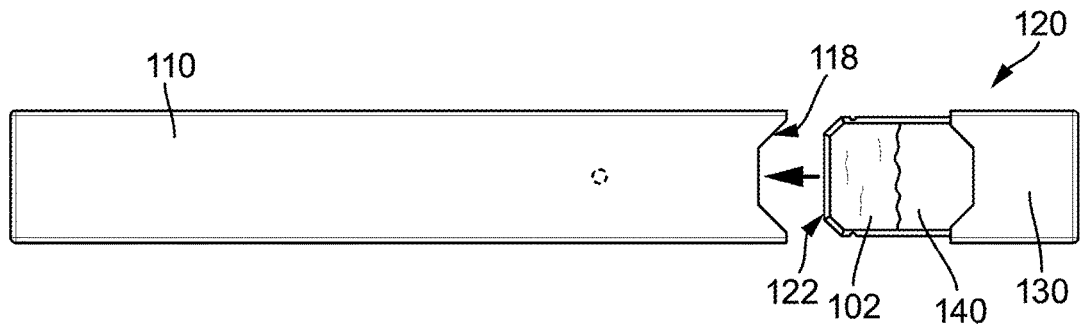
FIG. 1B illustrates a top view of an embodiment of the vaporizer of FIG. 1A showing a cartridge separated from a vaporizer device body.

FIG. 1B illustrates an embodiment of the vaporizer body 110 having a cartridge receptacle 118 into which the vaporizer cartridge 120 may be releasably inserted. FIG. 1B shows a top view of the vaporizer 100 illustrating the cartridge being positioned for insertion into the vaporizer body 110. When a user puffs on the vaporizer 100, air may pass between an outer surface of the vaporizer cartridge 120 and an inner surface of a cartridge receptacle 118 on the vaporizer body 110. Air can then be drawn into an insertable end 122 of the cartridge, through the vaporization chamber that includes or contains the heating element and wick, and out through an outlet of the mouthpiece 130 for delivery of the inhalable aerosol to a user. The reservoir 140 of the vaporizer cartridge 120 may be formed in whole or in part from translucent material such that a level of vaporizable material 102 is visible along the vaporizer cartridge 120.

In implementations according to the present disclosure, the vaporizer does not require a battery and/or a controller. The power source of the vaporizer is a fuel cell. The fuel cell generates more thermal energy than electrical energy and provides heat directly to the vaporizable material. The vaporizer powered by a fuel cell operates without having the need to be recharged using electricity, which allows the use of the vaporizer in areas that do not have access to electrical power. Additionally, a fuel cell powered vaporizer can heat up more quickly than a conventional battery powered vaporizer. The materials of construction of a fuel cell powered vaporizer may be more environmentally friendly and provide improved recyclability as compared to, for example, a lithium-ion or nickel-cadmium battery powered vaporizer. The fuel cell powered vaporizer can be configured to vaporize a variety of vaporizable materials, having a variety of contents and proportions of such contents. Some vaporizable materials, for example, may have a smaller percentage of active ingredients per total volume of vaporizable material, such as due to regulations requiring certain active ingredient percentages. As a result, a user may need to vaporize a large amount of vaporizable material (e.g., compared to the overall volume of vaporizable material that can be stored in a cartridge) to achieve a desired effect. By using a fuel cell powered vaporizer having superior thermal transfer as compared to a conventional vaporizer, the vaporizer is able to quickly vaporize larger amount of vaporizable material.

The fuel that powers a fuel cell has a much greater energy density than a battery (e.g. a lithium-ion battery). The energy density of the fuel for a fuel cell can be 10 times, 20 times, and even greater than 100 times the energy density of a battery. By utilizing an energy dense fuel, the overall size and weight of the fuel cell powered vaporizer can be reduced. As mentioned above, a fuel cell powered vaporizer can operate for longer periods of time before the fuel is replenished, as compared to the frequent need to recharge a battery powered vaporizer.

In some embodiments, a fuel cell powered vaporizer device may contain a small rechargeable battery, a capacitor, or other auxiliary power source, configured to power other device functions not related to heating a vaporizable material. For example, an auxiliary power source may be used to operate lights or other functions of the vaporizer device without needing to engage the fuel cell.

Figure 2A:
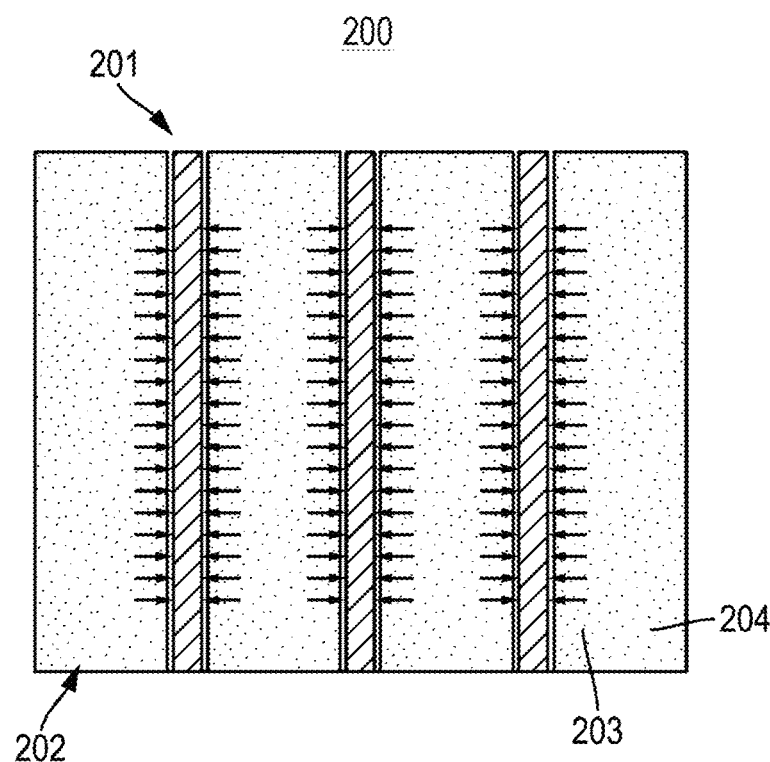
FIG. 2A illustrates a block diagram of a fuel cell and wicking elements consistent with implementations of the current subject matter.

FIG. 2A illustrates a block diagram of a fuel cell stack 200. The fuel cell that powers the vaporizer can be placed in an integrated fuel cell stack 200 with the heat produced being directly transferred to the vaporizable material, without the need for an electronic controller to regulate a temperature of resistive heating element. In this manner, the cost of the fuel cell powered vaporizer can be lower than a vaporizer that includes a battery and/or a controller. As shown in FIG. 2A, the vaporizable material is stored in a saturated media 201 and is at least partially interposed between the fuel cell elements 202. In some implementations, the saturated media 201 is a nicotine saturated media. In other implementations, the saturated media 201 is saturated with a vaporizable material that does not contain nicotine. The fuel cell elements 202 are configured to allow air 204 and fuel 203 to enter the fuel cell elements 202. In implementations, the fuel 203 may be a solid, liquid, and/or gas such as hydrogen, alcohol, butane, gasoline and other hydrocarbon fuels. In implementations, the fuel is a liquid hydrocarbon. In implementations, the fuel is an alcohol. In implementations, the fuel is the vaporizable material. For example, a solution comprising propylene glycol and vegetable glycerin can be used as the fuel for the fuel cell. In implementations, the saturated media 201 may be any porous material such as paper, cotton, ceramic, silica, etc. In these implementations, heat is transferred from the fuel cell elements 202 directly to the saturated media 201. In implementations, the saturated media 201 comprises a plurality of sheets. For example, about 10 sheets of paper can be used for a saturated media 201 that is disposed between two fuel cell elements 202 to receive heat and vaporize the vaporizable material contained therein. In implementations, the saturated media 201 comprises a porous material, such as a ceramic.

In implementations, each fuel cell element 202 within a fuel cell stack can be about 1 mm thick, or can be about 0.5 mm thick. In implementations, each fuel cell element 202 within a fuel cell stack can have a thickness in the range of 0.1 mm to 2 mm. In implementations, the fuel cell stack comprises three or more fuel cell elements 202 and two or more saturated media 201.

The implementation shown in FIG. 2A utilizes an integrated fuel cell stack 200 including a saturated media 201 containing vaporizable material, such as vaporizable material containing nicotine, positioned between fuel cell elements 202, with the heat produced being directly transferred to the saturated media 201 containing vaporizable material without the need for an electronic controller to regulate the temperature. This configuration provides several advantages. For example, heating may be more efficient due to heat from the fuel cell elements 202 being directly transferred through thermal conduction to the saturated media 201. Additionally, the amount and rate of heat transfer may be increased, as heat is more quickly transferred to the saturated media 201 due to its close contact and increased surface area, as compared to conventional atomizer and wick configurations. Furthermore, the implementation shown in FIG. 2A may offer increased temperature uniformity, and/or not result in the production of harmful emissions when hydrogen or alcohol are used as a fuel.

In implementations, the fuel cell has an operating temperature of about 500 degrees Celsius. In implementations, the fuel cell has an operating temperature below about 500 degrees Celsius. In implementations, the fuel cell has an operating temperature in the range of 270-290 degrees Celsius. In implementations, the fuel cell has an operating temperature in the range of 250-550 degrees Celsius. In implementations, the fuel cell operating temperature reforms the fuel prior to an oxidative reaction within the fuel cell.

Figure 2B:
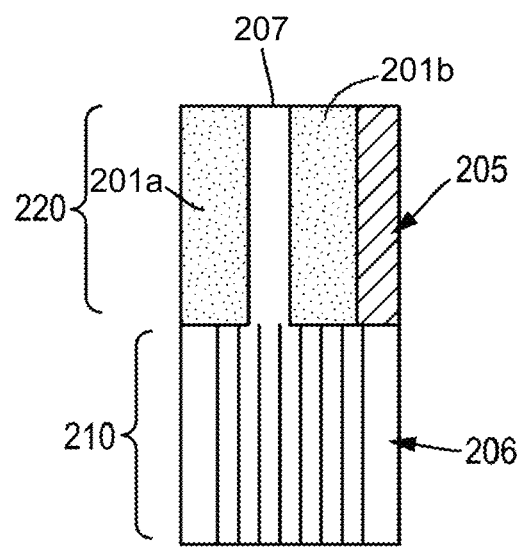
FIG. 2B illustrates a block diagram of a vaporizer device and a cartridge consistent with some implementations of the current subject matter.

In implementations, the fuel cell and vaporizable material are contained in separate components of the vaporizer. FIG. 2B illustrates a block diagram of a vaporizer body 210 coupled to a vaporizer cartridge 220. The device body 210 includes a fuel cell 206 coupled to the vaporizer cartridge 220 configured to contain the vaporizable material. In implementations, the coupling between the fuel cell 206 and the vaporizer cartridge 220 may result in a thermal coupling, a fluidic coupling, an electrical coupling, or combinations thereof. The vaporizer cartridge 220 contains a wick 207 that is fluidically coupled with a first compartment 201a and a second compartment 201b each configured to hold a vaporizable material. The vaporizer cartridge 220 also contains a fuel compartment 205 configured to hold a fuel. In implementations, the wick 207 may be thermally coupled with the fuel cell 206 and may be fluidically coupled to draw vaporizable material from a first compartment 201a and/or a second compartment 201b. In implementations, the fuel may be housed in a separate cartridge coupled to the device body 210, for example, attached an end opposite the vaporizable material cartridge. In implementations, the fuel cell 206 is a solid oxide fuel cell or a low temperature solid oxide fuel cell.

In implementations, the fuel cell according to the present disclosure is a solid oxide fuel cell. Solid oxide fuel cells are a class of fuel cells characterized by the use of a solid oxide material as the electrolyte. In general, solid oxide fuel cells use a solid oxide electrolyte to conduct negative oxygen ions from the cathode to the anode. The electrochemical oxidation of the oxygen ions with hydrogen or carbon monoxide thus occurs on the anode side. Solid oxide fuel cells can operate at high temperatures, at or above 500 degrees Celsius. Because of these high temperatures, light hydrocarbon fuels, such as methane, propane, butane, alcohol, and the like can be internally reformed within the anode. Solid oxide fuel cells can also be fueled by externally reforming heavier hydrocarbons, such as gasoline, diesel, jet fuel, or biofuels. Such reformates are mixtures of hydrogen, carbon monoxide, carbon dioxide, steam and methane, formed by reacting the hydrocarbon fuels with air or steam in the device upstream of the solid oxide fuel cell anode. Solid oxide fuel cell power systems can increase efficiency by using the heat given off by the exothermic electrochemical oxidation within the fuel cell for endothermic steam reforming process. Additionally, solid fuels such as coal and biomass may be gasified to form syngas, which is suitable for fueling solid oxide fuel cells.

In implementations, the fuel cell according to the present disclosure is a low-temperature solid oxide fuel cell. Low-temperature solid oxide fuel cells operate at temperatures less than or equal to 500 degrees Celsius. Low-temperature solid oxide fuel cells are more reliable, due to smaller thermal mismatch and easier sealing, and require less insulation and therefore cost less than a traditional solid oxide fuel cell. Low-temperature solid oxide fuel cells can also be started more rapidly and with less energy, due to operating at a lower temperature than that of a traditional solid oxide fuel cell.

Figure 3:
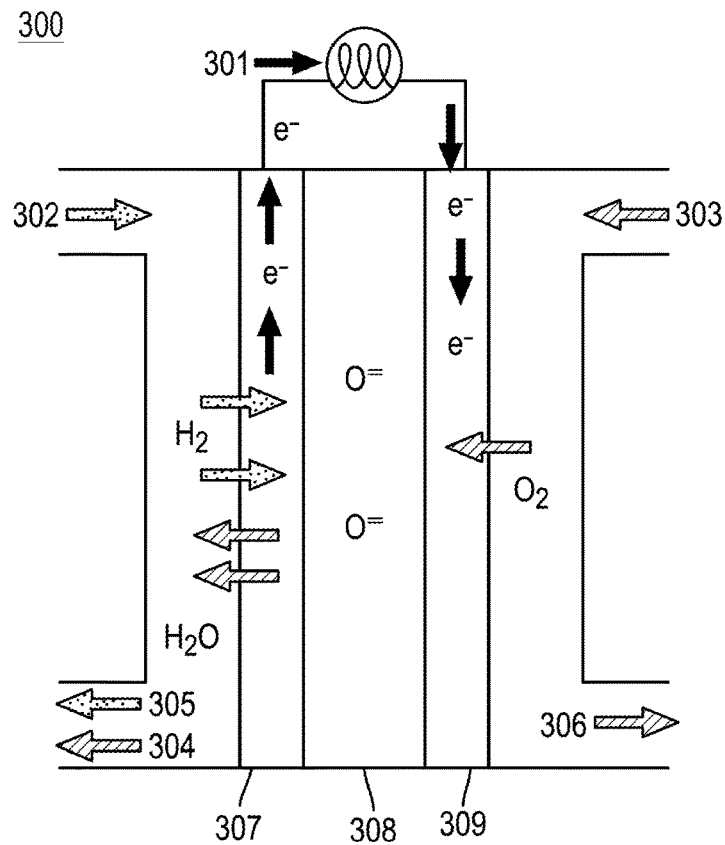
FIG. 3 illustrates a diagram of a solid oxide fuel cell stack.

FIG. 3 illustrates an operational diagram of a solid oxide fuel cell element 300. Electrical current 301 passes from the anode 307 to the cathode 309. Fuel 302 enters at an inlet on the side of the fuel cell element 300 containing the anode 307 and water 304 and excess fuel 305 exit at an outlet on the side of the fuel cell element 300 containing the anode 307, and the excess fuel 305 is recycled back into the fuel cell element 300. Air 303 enters the fuel cell at an inlet on the side of the fuel cell element 300 containing the cathode 309 and unused gases 306 exit at an outlet on the side of the fuel cell 300 containing the cathode 309. Disposed between the anode 307 and cathode 309 is an electrolyte 308. Fuel 302 may be reformed internally within the solid oxide fuel cell 300. In implementations, the electrolyte 308 may be an aqueous solution of potassium hydroxide, sodium hydroxide, etc. In implementations, the fuel cell can be constructed using cerium oxide, nickel oxide, strontium oxide, and combinations thereof. The solid oxide fuel cell element 300 provides high combined heat and power efficiency, long-term stability, and fuel flexibility. In implementations, the fuel cell is a solid oxide fuel cell. In implementations, the fuel cell is a low temperature solid oxide fuel cell. In implementations, the fuel cell is an alkaline fuel cell.

Figure 4:
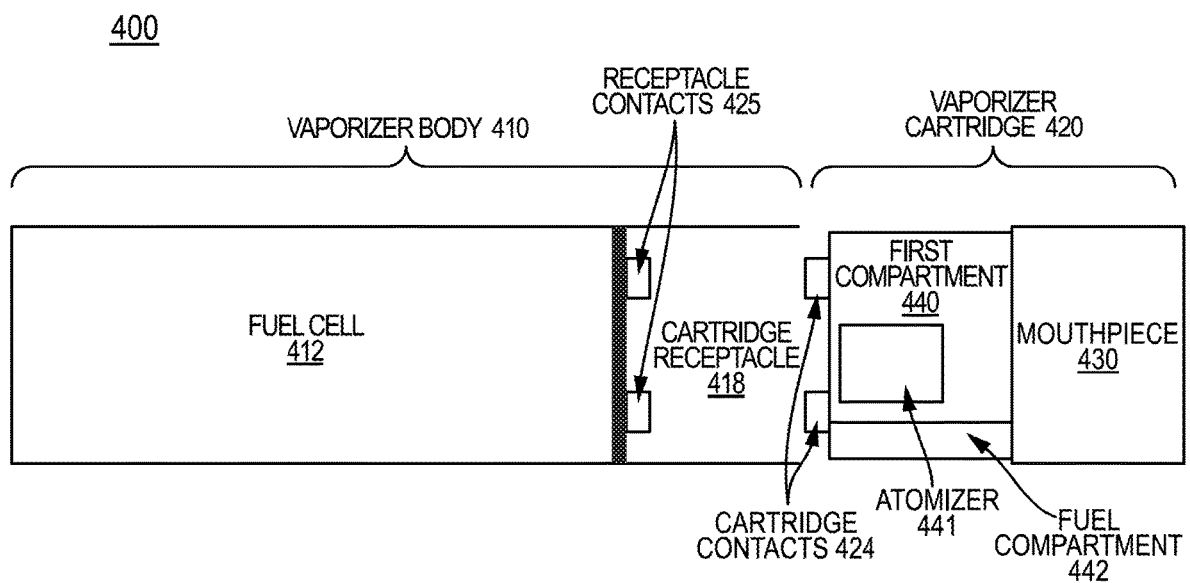
FIG. 4 illustrates a block diagram of a vaporizer consistent with implementations of the current subject matter.

FIG. 4 illustrates a block diagram of a vaporizer consistent with implementations of the current subject matter. Vaporizer 400 includes a vaporizer body 410 that contains a fuel cell 412 as a power source. Vaporizer 400 also includes a cartridge receptacle 418 configured to receive a vaporizer cartridge 420 for coupling with the vaporizer body 410 through one or more of a variety of attachment structures, fluidic couplings, thermal couplings and/or electrical couplings. In implementations, vaporizer cartridge 420 includes a first compartment 440 for containing a liquid vaporizable material and a mouthpiece 430 for delivering an inhalable dose to a user. The vaporizer cartridge 420 includes a fuel compartment 442 for containing fuel for the fuel cell. In implementations, vaporizer 400 does not include a battery and/or a controller. Additional vaporizer features described above may be incorporated into the vaporizer 400 mutatis mutandis, and where not mutually exclusive to the features of vaporizer 400 described herein.

Fuel compartment 442 is configured to contain the fuel for the fuel cell 412. In implementations, the fuel may be a solid, liquid, and/or gas such as hydrogen, alcohol, butane, gasoline and other hydrocarbon fuels. In implementations, the fuel is a liquid hydrocarbon. In implementations, the fuel is an alcohol. In implementations, the fuel is the vaporizable material. For example, a solution comprising propylene glycol and vegetable glycerin can be used as the fuel for the fuel cell.

Additionally or alternatively, the vaporizer 400 may include a plurality of fuel compartments configured to contain one or more fuels for the fuel cell 412. The vaporizer 400 may, additionally or alternatively, include a plurality of vaporizable material compartments configured to contain one or more vaporizable materials. In implementations, the vaporizable material may serve as the fuel, and the vaporizer 400 may have a single compartment configured to contain the vaporizable material.

In implementations, a fuel regulator can be disposed between the fuel compartment 442 containing the fuel, and the fuel cell 412. The reaction rate of the fuel cell can be controlled by regulating the flow rate of the fuel and/or oxidizer to the fuel cell. By controlling the reaction rate, the operating temperature of the fuel cell can be controlled, thus controlling the rate of vaporization of the vaporizable material. The fuel regulator can be a valve, a selector switch, a fuel wicking material, and combinations thereof. Similarly, an oxidizer regulator can be disposed between the fuel cell and outside air to meter or regulate oxygen flowing to the fuel cell.

In implementations, a vent valve or fuel vent wick may be disposed in the fuel compartment 442 containing the fuel to at least partially equalize pressure with the ambient pressure. Other approaches to allowing air back into the fuel compartment 442 to equalize pressure are also within the scope of the current subject matter. In implementations of the current subject matter, the fuel compartment 442 containing the fuel is unvented. In implementations of the current subject matter, fuel compartment 442 containing the fuel is pressurized.

In implementations, the exhaust from the fuel cell 412 can exit in a direction away from a user of the vaporizer. The exhaust from the fuel cell may comprise water vapor, carbon dioxide, and/or unreacted fuel.

Cartridge receptacle 418 of vaporizer body 410 includes receptacle contacts 425 that are configured to couple with cartridge contacts 424 of vaporizer cartridge 420. In implementations, receptacle contacts 425 fluidically couple, thermally couple, electrically couple, or combinations thereof, to the cartridge contacts 424. In implementations, receptacle contacts 425 fluidically couple to cartridge contacts 424 to provide fuel from the fuel compartment 442 to the fuel cell 412. In implementations, receptacle contacts 425 thermally couple to cartridge contacts 424 to provide heat from the fuel cell 412 to vaporize the vaporizable material. In this manner, thermal contacts in the cartridge receptacle conduct the heat from the fuel cell 412 to complementary contacts in the vaporizer cartridge 420 that heat the wick saturated with vaporizable material.

Fuel cells may produce electricity in addition to heat. The vaporizer 400 can optionally include multiple heating elements. For example, the fuel cell 412 can provide electricity produced by the fuel cell to power a resistive heating element. In implementations, receptacle contacts 425 electrically couple to cartridge contacts 424 to provide electricity from the fuel cell 412 to a heating element in vaporizer cartridge 420. The vaporization temperature can be controlled and regulated by adjusting the fuel cell temperature, thermal contact, electrical contact, and/or resistive heating element output. The thermal contacts and/or electrical contacts may optionally be gold-plated, and/or can include other materials. The thermal contacts and/or electrical contacts may optionally be aluminum and/or other material suitable for transferring energy to the atomizer. A heating element of vaporizer 400 can be or include one or more of a conductive heater, a radiative heater, and a convective heater.

Certain vaporizers may also or alternatively be configured to create an inhalable dose of gas-phase and/or aerosol-phase vaporizable material via heating of a non-liquid vaporizable material, such as for example a solid-phase vaporizable material (e.g., a wax or the like) or plant material (e.g., tobacco leaves and/or parts of tobacco leaves) containing the vaporizable material.

The fuel cell 412 may be activated by a switch, valve, or other means (e.g., a controller, which is optionally part of a vaporizer), to cause fuel and oxygen to flow to the fuel cell producing heat and current that pass from the vaporizer 400 to the vaporizer cartridge 420, in association with a user puffing (e.g., drawing, inhaling, etc.) on a mouthpiece 430 to cause air to flow from an air inlet, along an airflow path that passes an atomizer 441 (e.g., wicking element and heating element), optionally through one or more condensation areas or chambers, to an air outlet in the mouthpiece 430. Incoming air passing along the airflow path passes over, through, etc. the atomizer, where gas phase vaporizable material is entrained into the air. As noted above, the entrained gas-phase vaporizable material may condense as it passes through the remainder of the airflow path such that an inhalable dose of the vaporizable material in an aerosol form can be delivered from the air outlet (e.g., in a mouthpiece 430 for inhalation by a user).

In implementations, vaporizer 400 optionally includes a supplemental battery and/or an auxiliary controller. The supplemental battery may be configured to provide supplemental heat to a heating element, to power LEDs and/or the vaporizer when the fuel cell 412 is not in use, or to provide power to an auxiliary controller. The supplemental battery may be charged by the fuel cell 412. The vaporizer 400 may optionally include an auxiliary controller (e.g., a processor, circuitry, etc. capable of executing logic) configured to control heat to a resistive heating element, to control LED illumination, or to provide other information (e.g. power status, level of vaporizable material, operating temperature, etc.) to the user. The auxiliary controller may receive power from the fuel cell 412, or from the supplemental battery if present.

Terminology

The term "coupler" as used herein refers to any structure suitable for connecting a detachable object to a receiving object or receptacle, such as a mechanical coupler, a magnetic coupler, a static coupler, a friction coupler, an adhesive coupler, or the like.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present.

Although described or shown with respect to one implementation, the features and elements so described or shown can apply to other implementations. It will also be appreciated by those of skill in the art that references to a structure or feature that is disposed "adjacent" another feature may have portions that overlap or underlie the adjacent feature.

Terminology used herein is for the purpose of describing particular implementations and implementations only and is not intended to be limiting. For example, as used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and may be abbreviated as "/".

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

Spatially relative terms, such as "forward", "rearward", "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features.

Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal" and the like are used herein for the purpose of explanation only unless specifically indicated otherwise.

Although the terms "first" and "second" may be used herein to describe various features/elements (including steps), these features/elements should not be limited by these terms, unless the context indicates otherwise. These terms may be used to distinguish one feature/element from another feature/element. Thus, a first feature/element discussed below could be termed a second feature/element, and similarly, a second feature/element discussed below could be termed a first feature/element without departing from the teachings provided herein.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical values given herein should also be understood to include about or approximately that value, unless the context indicates otherwise. For example, if the value "10" is disclosed, then "about 10" is also disclosed. Any numerical range recited herein is intended to include all sub-ranges subsumed therein. It is also understood that when a value is disclosed that "less than or equal to" the value, "greater than or equal to the value" and possible ranges between values are also disclosed, as appropriately understood by the skilled artisan. For example, if the value "X" is disclosed the "less than or equal to X" as well as "greater than or equal to X" (e.g., where X is a numerical value) is also disclosed. It is also understood that the throughout the application, data is provided in a number of different formats, and that this data, represents endpoints and starting points, and ranges for any combination of the data points. For example, if a particular data point "10" and a particular data point "15" are disclosed, it is understood that greater than, greater than or equal to, less than, less than or equal to, and equal to 10 and 15 are considered disclosed as well as between 10 and 15. It is also understood that each unit between two particular units are also disclosed. For example, if 10 and 15 are disclosed, then 11, 12, 13, and 14 are also disclosed.

Although various illustrative implementations are described above, any of a number of changes may be made to various implementations without departing from the teachings herein. For example, the order in which various described method steps are performed may often be changed in alternative implementations, and in other alternative implementations, one or more method steps may be skipped altogether. Optional features of various device and system implementations may be included In implementations and not in others. Therefore, the foregoing description is provided primarily for exemplary purposes and should not be interpreted to limit the scope of the claims.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

The examples and illustrations included herein show, by way of illustration and not of limitation, specific implementations in which the subject matter may be practiced. As mentioned, other implementations may be utilized and derived there from, such that structural and logical substitutions and changes may be made without departing from the scope of this disclosure. Such implementations of the inventive subject matter may be referred to herein individually or collectively by the term "invention" merely for convenience and without intending to voluntarily limit the scope of this application to any single invention or inventive concept, if more than one is, in fact, disclosed. Thus, although specific implementations have been illustrated and described herein, any arrangement calculated to achieve the same purpose may be substituted for the specific implementations shown. This disclosure is intended to cover any and all adaptations or variations of various implementations. Combinations of the above implementations, and other implementations not specifically described herein, will be apparent to those of skill in the art upon reviewing the above description.

What is claimed is:

1. A cartridge for a vaporizer device, the vaporizer device having a fuel cell, the cartridge comprising:
a first compartment having a vaporizable material disposed therein, the vaporizable material comprising a nicotine formulation;
a second compartment configured to hold a fuel;
an outlet fluidically coupled to the second compartment and configured to deliver the fuel from the cartridge to the fuel cell; and
a vaporization chamber in fluid communication with the first compartment, the vaporization chamber configured to vaporize the vaporizable material included in the first compartment when the fuel from the second compartment is delivered to the fuel cell.

2. The cartridge of claim 1, wherein a level of the vaporizable material is visible through a transparent portion of the first compartment.

3. The cartridge of claim 1, wherein a level of the fuel is visible through a transparent portion of the second compartment.

4. The cartridge of claim 1, wherein the outlet is disposed at a first end of the cartridge.

5. The cartridge of claim 1, further comprising:
a resistive heater disposed within the vaporization chamber.

6. The cartridge of claim 1, further comprising:
a conductive heating element disposed within the vaporization chamber.

7. The cartridge of claim 6, further comprising:
a cartridge thermal contact disposed on an outer surface of the cartridge, the cartridge thermal contact configured to conduct heat from the fuel cell to the cartridge.

8. The cartridge of claim 6, further comprising:
a cartridge thermal contact disposed in a recessed portion of the cartridge to conduct heat from the fuel cell to the cartridge.

9. The cartridge of claim 1, further comprising:
a wick having a first portion fluidically coupled to the first compartment and a second portion fluidically coupled to the vaporization chamber, the wick configured to transport the vaporizable material into the vaporization chamber.

10. The cartridge of claim 1, wherein the second compartment further comprises:
an expansion chamber configured to reduce a pressure buildup.

11. The cartridge of claim 1, wherein the fuel cell is a solid oxide fuel cell.

12. The cartridge of claim 1 wherein the fuel cell is a low temperature solid oxide fuel cell.

13. The cartridge of claim 1 wherein the fuel cell operates at a temperature less than or equal to 500 degrees Celsius.

14. The cartridge of claim 1 wherein the fuel cell operates at a temperature in the range of 270 to 290 degrees Celsius.

15. A cartridge for a vaporizer device, the vaporizer device having a fuel cell, the cartridge having a first end and a second end that is opposite the first end, the cartridge comprising:
a first compartment configured to hold a vaporizable material;
a second compartment configured to hold a fuel;
an outlet fluidically coupled to the second compartment and configured to deliver the fuel to the fuel cell;
a vaporization chamber in fluid communication with the first compartment, the vaporization chamber configured to vaporize the vaporizable material included in the first compartment when the fuel from the second compartment is delivered to the fuel cell; and
a mouthpiece disposed at a second end of the cartridge, and wherein the second end is opposite to the first end.

16. The cartridge of claim 15, further comprising:
a cannula to fluidically couple the vaporization chamber to the mouthpiece.

17. The cartridge of claim 15, wherein the vaporization chamber is disposed within the mouthpiece.

18. The cartridge of claim 15, further comprising:
a cartridge electrical contact disposed on an outer surface of the cartridge, the cartridge electrical contact configured to conduct heat from the fuel cell to the cartridge.

19. A vaporizer device comprising:
a saturated media having a vaporizable material disposed therein, the vaporizable material comprising a nicotine formulation;
a fuel compartment configured to hold a fuel; and
a fuel cell in thermal contact with the saturated media and configured to produce heat transferrable to a vaporizable material,
wherein the fuel compartment comprises an outlet fluidly coupled to the fuel cell and configured to deliver the fuel from the fuel compartment to the fuel cell.

20. A vaporizer device comprising:
a body comprising a fuel cell; and
a cartridge separably coupled to the body, the cartridge comprising:
a first compartment having a vaporizable material disposed therein, the vaporizable material comprising a nicotine formulation;
a second compartment configured to hold a fuel;
an outlet fluidically coupled to the second compartment and configured to deliver
the fuel to the fuel cell; and
a vaporization chamber in fluid communication with the first compartment, the vaporization chamber configured to vaporize the vaporizable material included in the first compartment when the fuel from the second compartment is delivered to the fuel cell.

* * * * *